US008637166B2

(12) United States Patent
Ayer et al.

(10) Patent No.: US 8,637,166 B2
(45) Date of Patent: Jan. 28, 2014

(54) HIGH STRENGTH NICKEL ALLOY WELDS THROUGH STRAIN HARDENING

(75) Inventors: Raghavan Ayer, Basking Ridge, NJ (US); Neeraj Srinivas Thirumalai, Easton, PA (US); Hyun-Woo Jin, Easton, PA (US); Daniel B. Lillig, Sugar Land, TX (US); Douglas Paul Fairchild, Sugar Land, TX (US); Steven Jeffrey Ford, Missouri City, TX (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 716 days.

(21) Appl. No.: 12/316,759

(22) Filed: Dec. 16, 2008

(65) Prior Publication Data

US 2010/0021761 A1 Jan. 28, 2010

Related U.S. Application Data

(60) Provisional application No. 61/007,993, filed on Dec. 17, 2007.

(51) Int. Cl.
  *B32B 15/01* (2006.01)
  *B23K 26/32* (2006.01)

(52) U.S. Cl.
  USPC ... 428/679; 428/680; 228/262.3; 228/262.44; 219/121.13; 219/131.45; 219/121.46; 219/121.63; 219/121.64

(58) Field of Classification Search
  USPC .............. 228/101, 112.1, 2.1; 428/657, 655
  See application file for complete search history.

(56) References Cited

U.S. PATENT DOCUMENTS

| | | | |
|---|---|---|---|
| 2,081,394 A * | 5/1937 | De Golyer | 420/37 |
| 3,502,450 A * | 3/1970 | McCoy et al. | 428/680 |
| 4,909,860 A * | 3/1990 | England et al. | 148/677 |
| 6,230,957 B1 | 5/2001 | Arbegast et al. | |
| 6,379,821 B2 * | 4/2002 | Kushida et al. | 428/685 |
| 6,708,867 B2 * | 3/2004 | Yoshinaga | 228/112.1 |

(Continued)

FOREIGN PATENT DOCUMENTS

GB 962744 A 7/1964

OTHER PUBLICATIONS

Techalloy Central Wire Group Website Techalloy 276 Data Sheet, Feb. 6, 2006, www.techalloy.com.*

(Continued)

*Primary Examiner* — Mark Ruthkosky
*Assistant Examiner* — Daniel J Schleis
(74) *Attorney, Agent, or Firm* — Robert A. Migliorini (57) ABSTRACT

Provided are strain hardened high strength nickel based alloy welds that yield improved properties and performance in joining high strength metals. The advantageous weldments include two or more segments of ferrous or non-ferrous components, and fusion welds, friction stir welds, electron beam welds, laser beam welds, or a combination thereof bonding adjacent segments of the components together, wherein the welds comprise a strain hardened nickel based alloy weld metal composition including greater than or equal to 10 wt % Mo based on the total weight of the nickel based alloy weld metal composition. Also provided are methods for forming the welds from the nickel based alloy weld compositions. The strain hardened high strength nickel based alloy welds are useful in the oil, gas and petrochemical industry in applications for natural gas transportation and storage, oil and gas well completion and production, and oil and gas refinery and chemical plants.

43 Claims, 1 Drawing Sheet

(56) References Cited

U.S. PATENT DOCUMENTS

| | | | |
|---|---|---|---|
| 6,994,916 B2* | 2/2006 | Forrest et al. | 428/594 |
| 2006/0086708 A1* | 4/2006 | Coleman et al. | 219/137 WM |
| 2007/0175967 A1 | 8/2007 | Bangaru et al. | |

OTHER PUBLICATIONS

ASM International Handbook Committee (1993); ASM Handbook, vol. 06—Welding, Brazing, and Soldering; ASM International.*

Sampath, K.; "An Understanding of HSLA-65 Plate Steels"; Journal of Materials Engineering and Performance; vol. 15(1), pp. 32-40; Feb. 2006.*

U.S. Appl. No. 11/901,488, filed Sep. 19, 2007, ExxonMobil Research & Eng.

U.S. Appl. No. 61/007,944, filed Dec. 17, 2007, ExxonMobil Research & Eng.

* cited by examiner

HIGH STRENGTH NICKEL ALLOY WELDS THROUGH STRAIN HARDENING

CROSS-REFERENCE TO RELATED APPLICATIONS

This is a Non-Provisional Application that claims priority to U.S. Provisional Application 61/007,993 filed Dec. 17, 2007, which is herein incorporated by reference.

FIELD

The present disclosure relates generally to the field of welding of steel structures and components. More specifically, the present disclosure relates to is welding of steel structures and components with nickel based weld metals that undergo strain hardening to achieve high performance joints.

BACKGROUND OF THE INVENTION

For convenience, various welding terms used in this specification are defined in the Glossary of Terms below.
Glossary of Terms
CRA: Corrosion resistant alloys. A specially formulated material used for completion components likely to present corrosion problems. Corrosion-resistant alloys may be formulated for a wide range of aggressive conditions.
HAZ: Heat-affected-zone.
Heat-affected-zone: Base metal that is adjacent to the weld line and that was affected by the heat of welding.
Toughness: Resistance to fracture initiation.
Fatigue: Resistance to fracture under cyclic loading.
Fretting fatigue: Fretting involves contact between surfaces undergoing small cyclic relative tangential motion. Fretting fatigue resistance is resistance to fracture in a notched metal parts or metal parts with holes.
Yield Strength: Ability to bear load without deformation.
FS: Friction stir.
FSW: Friction stir welding.
Friction Stir Welding: A solid state joining process for creating a welded joint between two work pieces in which the heat for joining the metal work pieces is generated by plunging a rotating pin of a tool between the work pieces.
FSP: Friction stir processing.
Friction stir processing: The method of processing and conditioning the surface of a structure by pressing a FSW tool against the surface by partially plunging a pin into the structure.
Weld joint: A welded joint including the fused or thermo-mechanically altered metal and the base metal in the "near vicinity" of, but beyond, the fused metal. The portion of the base metal that is considered within the "near vicinity" of the fused metal varies depending on factors known to those in the welding art.
Weldment: An assembly of component parts joined by welding.
Weldability: The feasibility of welding a particular metal or alloy. A number of factors affect weldability including chemistry, surface finish, heat-treating tendencies and the like.
Carbon equivalent: A parameter used to define weldability of steels and expressed by the formula $CE=C+Mn/6+(Cr+Mo+V)/5+(Ni+Cu)/15$ where all units are in weight percent.
Hydrogen cracking: Cracking that occurs in the weld subsequent to welding.
TMAZ: Thermo-mechanically affected zone.
Thermo-mechanically affected zone: Region of the joint that has experienced both temperature cycling and plastic deformation.
TMAZ-HZ: The hardest region in a weldment.
LNG: Liquefied natural gas. Gas, mainly methane, liquefied under atmospheric pressure and low temperature.
CNG: Compressed natural gas. Natural gas in high-pressure surface containers that is highly compressed (though not to the point of liquefaction).
PLNG: Pressurized liquefied natural gas. Gas, mainly methane, liquefied under moderate pressure and low temperature (higher temperature than LNG).
SCR: Steel catenary riser. A deepwater steel riser suspended in a single catenary from a platform and connected horizontally on the seabed.
TTR: Top tension riser. A riser on offshore oil rigs which is placed in tension to maintain even pressure on marine riser pipe.
Invar: An alloy of iron and nickel specifically designed to have low coefficient of thermal expansion
Duplex: Steel consisting of two phases, specifically austenite and ferrite.
Trees: The assembly of valves, pipes, and fittings used to control the flow of oil and gas from a well.
BOP: Blow Out Preventer. The equipment installed at the wellhead to control pressures in the annular space between the casing and drill pipe or tubing during drilling, completion, and work over operations.
OCTG: Oil Country Tubular Goods. A term applied to casing, tubing, plain-end casing liners, pup joints, couplings, connectors and plain-end drill pipe.
Semi-submersibles: Mobile drilling platform with floats or pontoons submerged to give stability while operating. Used in deeper waters down to 360 meters or more. Kept in position by anchors or dynamic positioning.
Jack-up rigs: Mobile drilling platform with retractable legs used in shallow waters less than 100 meters deep.
TLP: Tension Leg Platform. A floating offshore structure held in position by a number of tension-maintaining cables anchored to seabed. Cables dampen wave action to keep platform stationary.
DDCV: Deep Draft Caisson Vessel. Deep draft surface piercing cylinder type of floater, particularly well adapted to deepwater, which accommodates drilling, top tensioned risers and dry completions.
Compliant towers: Narrow, flexible towers and a piled foundation supporting a conventional deck for drilling and production operations. Designed to sustain significant lateral deflections and forces, and are typically used in water depths ranging from 1,500 to 3,000 feet (450 to 900 m).
FPSO: Floating Production Storage and Offloading vessel. A converted or custom-built ship-shaped floater, employed to process oil and gas and for temporary storage of the oil prior to transshipment.
FSO: Floating Storage and Offloading vessel. A floating storage device, usually for oil, commonly used where it is not possible or efficient to lay a pipe-line to the shore. The production platform will transfer the oil to the FSO where it will be stored until a tanker arrives and connects to the FSO to offload it.
Tendons: Tubular tethers that permanently moor a floating platform attached at each of the structure's corners.
Umbilicals: An assembly of hydraulic hoses which can also include electrical cables or optic fibers, used to control a subsea structure or ROV from a platform or a vessel.
Tender vessels: A support/supply ship for carrying passengers and supplies to and from facilities close to shore.

Strain hardening: The increase in hardness and strength of a ductile metal as it is plastically deformed.

X65: A line pipe steel with a yield strength of 65 Ksi (65,000 psi).

Electron beam welding (EBW): A welding process in which a beam of high-velocity electrons is applied to the materials being joined. The workpieces melt as the kinetic energy of the electrons is transformed into heat upon impact, and the filler metal, if used, also melts to form part of the weld. Pressure is not applied, and a shielding gas is not used, though the welding is often done in conditions of a vacuum to prevent dispersion of the electron beam.

Laser beam welding (LBW): A welding process used to join multiple pieces of metal through the use of a laser. The beam provides a concentrated heat source, allowing for narrow, deep welds and high welding rates.

Long-Felt Need

Most steel structures are welded with steel (also referred to as ferrous-based, or iron-based) weld metals. These steel welds are generally iron with about 0.1 wt % carbon and up to 2 to 3 wt % of other alloying elements, such as Mn, Ni, Cu and combinations thereof. The toughness and residual stresses that are developed in these ferrous welds/weldments are the result of complex interactions of the properties of the base steel, the type of weld metal, and the thermal cycles associated with the welding process. The performance of most welded structures (e.g. load bearing ability, fatigue, environmental cracking) is controlled by the properties of the weldments, which consist of the weld and the heat affected zone (HAZ). Although the properties of the weld can be controlled by the design of the weld metal chemistry, the joint performance is dictated by a complex interaction between base/weld metal chemistries and the weld procedure. Historically, most steel structures are joined by fusion welding using iron-based weld metals. The primary reasons for the use of iron-base welds have been their low cost, the ability to match the strength of the base metal through alloying, and extensive use in the industry.

Although deficiencies in weldment integrity for many land-based structural applications can be accommodated through enhanced redundancy, such an approach is not practical or economical for offshore and deepwater structures where component weight is critical. In these structures, it is necessary to enhance the weldment integrity so that they are not limiting the integrity of the structure. The joining of metal parts such as pipes and tubes to form pipelines for oil, gas and geothermal wells and the like is largely performed by conventional arc or fusion welding of steel structures or components with these conventional iron-based weld metals. Arc or fusion welding typically involves the melting of a steel weld metal to create the joint joining of two ferrous components or parts.

Such ferrous-based metal joints typically have acceptable properties, however improvements in strength, toughness and integrity of the weldment would further improve weldment performance, and correspondingly structure/component performance. For example, in welding steel pipes for offshore pipelines with ferrous-based weldments, there is the problem of bending stresses that results from the completed pipe hanging off the stern of the laybarge. In addition, conventional ferrous-based fusion welded joints suffer from other attributes which degrade the mechanical integrity of the joints. Examples of such attributes are tensile residual stress, hydrogen cracking, lack of fusion defects and low toughness.

Nickel alloy welds comprised of Inconel 625 are used to weld some high strength steels (e.g. X-65 steel pipe) to yield superior fatigue strength of the weldment. In these joints, the yield strength of the Inconel 625 alloy (about 70 Ksi) is greater than the yield strength of the X-65 steel (65 Ksi) to be welded, which provides for an overmatched condition. The primary origin of this fatigue strength enhancement of the joint arises from the superior fatigue properties of the Inconel 625 nickel alloy welds. However, when welding higher strength steel pipes (e.g. X-80 steel—yield strength of 80 Ksi (551.6 MPa)), Inconel 625 does not provide for an overmatched condition. Hence there is a need for novel weld metal compositions that provide for higher yield strength than the weld metal compositions currently known in the art in order to provide improved properties to the weldment. More particularly, there is a need for higher strength nickel alloy weld metal compositions for use in joining high strength ferrous and non-ferrous substrates to provide an overmatched condition and an improvement in weldment fatigue properties and performance.

SUMMARY

Broadly stated, the present disclosure provides the use of weld metals that are made of nickel based alloys in which the strengthening comes from sources other than carbon to improve weldment properties and performance in 1o joining steel components and structures. More particularly, the improved weldment properties are achieved through the use of nickel based compositions that undergo strain hardening during weldment cooling to improve properties, and hence find particular application in joining high strength structures.

In one form of the present disclosure is provided an advantageous weldment comprising: two or more segments of ferrous or non-ferrous components, and fusion welds, friction stir welds, electron beam welds, laser beam welds, or a combination thereof bonding adjacent segments of the components together, wherein the welds comprise a strain hardened nickel based alloy weld metal composition including greater than or equal to 10 wt % Mo based on the total weight of the nickel based alloy weld metal composition.

In another form of the present disclosure is provided an advantageous method of joining two or more metal structures comprising: providing two or more segments of ferrous or non-ferrous components, and fusion welding, friction stir welding, electron beam welding, laser beam welding, or a combination thereof adjacent segments of the components together, wherein the welds comprise a strain hardened nickel based alloy weld metal composition including greater than or equal to 10 wt % Mo based on the total weight of the strain hardened nickel based alloy weld metal composition.

In still another form of the present disclosure is provided an advantageous method for welding two or more ferrous or non-ferrous components to produce a weld having a specific property or set of properties chosen for an intended application, the method comprising: obtaining a data base of weld properties for nickel based welds formed by fusion welding, friction stir welding, electron beam welding, laser beam welding, or a combination thereof under a plurality of conditions and from various weld metal compositions; correlating the weld conditions and weld metal compositions to the weld properties; selecting the weld conditions from the data base that will produce a weld having the property or set of properties best suited to the intended application; subjecting the components to fusion welding, friction stir welding, electron beam welding, laser beam welding, or a combination thereof under the conditions selected to form a welded structure, wherein the weld comprises a strain hardened nickel based alloy weld metal composition including greater than or equal to 10 wt % Mo based on the total weight of the strain hardened nickel based alloy weld metal composition.

These and other forms of the novel strain hardened high strength nickel based alloy weld compositions, methods of welding with such compositions, and applications of such compositions in oil and gas applications disclosed herein will become apparent upon a reading of the detailed description which follows.

BRIEF DESCRIPTION OF DRAWINGS

To assist those of ordinary skill in the relevant art in making and using the subject matter hereof, reference is made to the appended drawings, wherein.

DETAILED DESCRIPTION

The present disclosure is directed at novel nickel based alloy weld compositions that undergo strain hardening for joining higher strength steels (greater than 80 Ksi (551.6 MPa) yield strength) in order to achieve superior mechanical properties such as fatigue strength, or strain capacity of the weldment. Currently, austenitic alloys, such as Inconel 625, are used to weld high strength steel, such as X-65 grade line pipe steel. The strength of the Inconel 625 welds is about 70 Ksi (482.6 MPa) which provides the required overmatch for the X-65 steel (65 Ksi (448.2 MPa) yield strength). Inconel 625 includes 22 wt % Cr, 9 wt % Mo, 3 wt % Nb, 5 wt % Fe, 0.6 wt % Al+Ti and the balance Ni. Over matched welds for greater than 80 Ksi (551.6 MPa) yield strength steels require nickel alloy weld metal compositions which would have yield strength of about 90 Ksi (620.5 MPa) or higher, which requires novel weld metal compositions to achieve an overmatched condition. It is advantageous to achieve the required strength in a single phase nickel alloy where the sole source of strengthening is through solid solution. Using the strain hardening method for use with the nickel based alloy weld compositions disclosed herein, higher strength is obtained through controlling the work hardening rate as opposed to through precipitation hardening.

Although weldment properties may be influenced by the weld procedure, it has been discovered that a comparable or greater effect can be achieved if the weld metal has a composition and properties that are substantially different from those of the base steel components to be welded. Specifically, the thermal expansion coefficient of the weld metal and the ability to control the phase transformation temperature (in some systems) provide the ability to better control the weld metal properties. In addition, the crystal structure of the weld metal (e.g. cubic vs. hexagonal) and its effect on the mechanical flow can have a significant effect on weldment properties. It has been discovered that strain hardened nickel based alloy metal compositions can be tailored to achieve specific properties for enhanced weldment integrity when joining ferrous and non-ferrous based metal components.

U.S. patent application Ser. No. 11/901,488 filed on Sep. 19, 2007 discloses metal structures and methods of forming such structures for use in oil, gas and/or petrochemical applications that are joined with non-ferrous weld metal compositions or a high alloy weld metal compositions. The welded metal structures include two or more segments of ferrous or non-ferrous components, and fusion welds, friction stir welds or a combination thereof bonding adjacent segments of the components together, wherein the welds comprise a non-ferrous weld metal composition or a high alloy weld metal composition that is substantially different from the metal composition of the two or more components. The resultant welded structures exhibit improvements in fatigue resistance, toughness, strain capacity, strength, stress corrosion cracking resistance, and hydrogen embrittlement resistance compared to traditional iron-based weld compositions. U.S. patent application Ser. No. 11/901,488 is herein incorporated by reference in its entirety.

The present disclosure provides for higher strength nickel based alloy welds and methods of achieving such welds through strain hardening. When joints are welded with nickel based alloys, each weld bead under goes solidification shrinkage. The shrinkage may be primarily focused in the weld bead in cases where there is significant constraint from the base metal. Part of the shrinkage of the weld bead may occur at higher temperatures (approximately above half the melting point expressed in degrees K) and may be dissipated through recovery and recrystallization, and thus may have little impact on the mechanical properties of the weld metal. However, deformation of the nickel based alloy weld bead that occurs at lower temperatures is accommodated as permanent plastic deformation. The permanent plastic deformation of the nickel based weld metal results in strain hardening (also referred to as work hardening) of the weldment and a corresponding improvement in its strength. The strength of the nickel based alloy weld metal is, therefore, dependent on the ability of the weld alloy to strain harden. Therefore, by controlling the work hardening response of the nickel based alloy weld metal compositions disclosed herein, the strength levels in the weld metal may be tailored to the properties desired. The work hardening response is determined by the cooling rate of the weldment. Generally, with fusion welding, friction stir welding, electron beam welding, or laser beam welding, the cooling rate is dictated by the ambient conditions surrounding the welding area. However, the current disclosure also comprehends artificial means for cooling the weldment to further increase and control the cooling rate of the weldment to further tailor the strain hardening response of the nickel based alloy weld metal compositions disclosed herein. Such means for artificially cooling the weldment after fusion, friction stir, laser beam and electron beam welding include, but are not limited to, forced air convention, liquid cooling (advantageously water), wherein the temperature of the cooling medium (e.g. water, air or other fluid) is controlled.

The present disclosure relates to the design of specific weld metal chemistries to achieve higher strength of nickel alloy fusion welds, friction welds, laser beam welds, and/or electron beam welds. The specific nickel alloy-based weld metal chemistries may be incorporated within existing welding practices and can be performed with existing hardware. It has been discovered that the work hardening response of nickel based alloy welds may be controlled by the chemistry of the alloy. It has been discovered that the addition of certain alloying elements, such as Mo and/or W, to nickel increases the work hardening rate of the weldment during cooling, which enhance the properties of the weldment. Therefore, chemistries of nickel alloys with high concentrations of molybdenum and/or tungsten provide higher strength welds for joining ferrous metals.

In one form, the high strength nickel based alloy weld compositions disclosed herein include Mo at from 0 to 40 wt %, or 5 to 35 wt %, or advantageously from 10 to 30 wt %, or more advantageously from 15 to 25 wt %. In another form, the nickel based alloy includes W at from 0 to 10 wt %, or 2 to 8 wt %, or advantageously from 3 to 6 wt %. In one form, the nickel based alloys disclosed herein also include Cr to enhance corrosion resistance at from 0 to 25 wt %, or 5 to 20 wt %, or 8 to 18 wt %, or 10 to 16 wt %. In one advantageous form, the high strength nickel based alloy weld compositions disclosed herein include Mo at greater than or equal to 10 wt % and W at greater than equal to 2 wt %. In another advantageous form, the high strength nickel based alloy weld compositions disclosed herein include a combination of Cr, Mo, and W, wherein the Cr ranges from 5 to 20 wt %, the Mo ranges from 10 to 20 wt %, and the W ranges from 2 to 8 wt %. In yet another advantageous form, the nickel based alloy includes a combination of Cr and Mo, wherein the Cr ranges from 5 to 20 wt % and the Mo ranges from 10 to 20 wt %.

The high strength nickel based alloy weld compositions for strain hardening disclosed herein may also include one or more other alloying elements. Other alloying elements may be added to the nickel based alloys depending on the system and include V, Ti, Co, Mn, Ta, Zr, Hf, aluminum, tin, silicon, niobium, and combinations thereof. Some non-limiting exemplary ranges of addition of these alloying elements are as follows: Ti from 0 to 10 wt %, Ta from 0 to 10 wt %, Zr from 0 to 10 wt %, Hf from 0 to 10 wt %, V from 0 to 10 wt %, and Nb from 0 to 20 wt %.

Non-limiting exemplary commercially available nickel based alloys, which provide for higher work hardening when used as a weld metal to join ferrous and non-ferrous substrates, include Hastelloy B2, Hastelloy C-276, and other Hastelloy series alloys including greater than or equal to 10 wt % Mo and/or greater than or equal to 2 wt % W. Hastelloy B2 includes 25-30 wt % Mo, 1 wt % Co and the balance Ni. Hastelloy C-276 includes 14.5-16.5 wt % Cr, 4-7 wt % C, 15-17 wt % Mo, 3-4.5 wt % W, up to 2.5 wt % Co and the balance Ni. Inconel 625 includes 21 wt % Cr, 5 wt % Fe, 10 wt % Mo, 4 wt % Nb and the balance Ni. Additional nickel based alloy chemistries to achieve high strength via strain hardening may also be designed to meet target strengths based on the strength of the metals to be joined. Hence, when joining higher strength metals via fusion, friction stir, electron beam, or laser beam welding, a higher strength nickel based alloy weld metal composition will be required to achieve an overmatched condition of the weldment relative to the metal structure for joining.

For the nickel based alloy weld compositions disclosed herein, greater than 50 wt %, or greater than 60 wt %, or greater than 70 wt %, or greater than 80 wt %, or greater than 90 wt % of the alloy, or greater than 95 wt % of the alloy is chosen from one or more of the following elements: Ni, Mo, W, and Cr. In addition, these nickel based alloy weld compositions disclosed herein, may also optionally include iron at less than 50 wt %, or less than 40 wt %, or less than 30 wt %, or less than 20 wt %, or less than 10 wt %, or less than 5 wt %. The strength in these nickel based alloy weld compositions arises as a result of strain hardening that occurs from plastic deformation and shrinkage of the weld during cooling. The nickel based alloy weld compositions may be either commercial alloys (such as Hastelloy B2, Hastelloy C-276, and other Hastelloy series alloys having greater than or equal to 10 wt % Mo and/or greater than or equal to 2 wt % W) or a non-commercial nickel based alloy including Mo at greater than or equal to 10 wt % and/or and W at greater than or equal to 2 wt % with optional addition of Cr and other alloying elements. Alternatively, the nickel based weld metal compositions may be made up of a combination of commercial nickel based alloys and non-commercial nickel based alloys.

Figure 1:
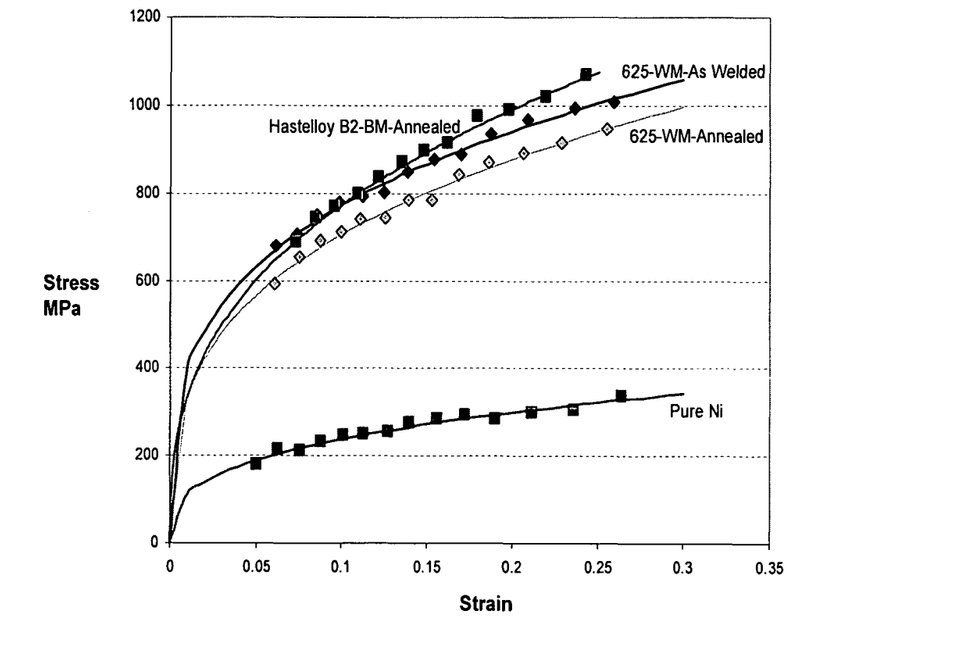
FIG. 1 depicts an exemplary schematic of the compressive strength versus strain of various strain hardened nickel based weld metal compositions used for joining steels.

FIG. 1 is a plot of weld strength versus strain for various nickel based weld metal compositions. The strain is a measure of weld contraction or strain hardening during cooling. A pure nickel weld metal compositions yielded relatively poor tensile strength upon strain hardening compared to a Hastelloy B2 and Inconel 625 (prior art) weld metal compositions. In particular, the pure Ni weld metal compositions yielded a tensile strength of less than 400 MPa, whereas the nickel based alloy compositions yield tensile strengths upon strain hardening greater than 800 MPa. Referring to FIG. 1, the impact of annealing the nickel based alloy weld metal composition can also be seen relative to the as-welded state. The weld strength of Hastelloy B2—annealed is significantly greater than Inconel 625—annealed (prior art) due to the presence of the Mo and W in the composition of the Hastelloy B2. In other words, for a given strain, the Hastelloy B2—annealed has a greater weld strength than Inconel 625—annealed (prior art). In addition, the slope of the stress-strain curve for the Hastelloy B2—annealed is significantly greater than the slope of the stress-strain curve for Inconel 625—annealed (prior art), which is again attributable to the presence of the Mo and W alloying elements in the composition of the Hastelloy B2.

The current disclosure also relates to the use of such strain hardened nickel based alloy weld metal compositions to join steel structures (replacing conventionally used steels weld metals and Inconel 625) to achieve high performance joints. The weld metal plays a key role in the properties of the weldments. Replacement of conventional steel weld metals and Inconel 625 with the high strength strain hardened nickel based alloy weld metal compositions disclosed herein enhances the weldment integrity in several ways. First, the strain hardened high strength nickel based alloy weld metal compositions disclosed herein may enhance the strength and toughness of the welds as a result of their inherent microstructures. Second, the strain hardened high strength nickel based alloy weld metal compositions disclosed herein may enhance the integrity of the weldment through their effect on the residual stress as a result of their effect on the physical properties such as strain hardening coefficient, coefficient of thermal expansion, latent heat of fusion, higher phase transformation temperature and different high temperature flow stress. The difference in these properties compared to steel component/structure being welded provides opportunities to enhance weldment properties, such as fatigue, HAZ and weld metal strength and toughness.

In one aspect, the strain hardened high strength nickel based alloy weld metal compositions disclosed herein are useful in welding cast irons and carbon steel components. In another aspect, the strain hardened nickel based alloy weld metal compositions disclosed herein are particularly useful in welding high carbon steels, especially those having a CE equal to or greater than 0.48. Exemplary, but not limiting, plain carbon and alloy steels include, AISI 1010, 1020, 1040, 1080, 1095, A36, A516, A440, A633, A656, 4063, 4340, and 6150. Exemplary, but not limiting, high carbon steels include, AISI WI, SI, O1, A2, D2, M1, and API L80. In another aspect of the present disclosure, the strain hardened high strength nickel based alloy weld metal compositions disclosed herein are useful in welding ferrous corrosion resistant alloys, including but not limited to, stainless steel. Exemplary, but not limiting, stainless steels include, AISI 409, 446, 304, 316L, 410, 440A, 17-7PH and duplex stainless steel. In a further aspect of the present disclosure, the strain hardened high strength nickel based alloy weld metal compositions disclosed herein are useful in treating/welding non-ferrous alloys, including, but not limited to, titanium alloys, cobalt alloys, iron-nickel alloy, and nickel alloys. In still a further aspect of the present disclosure, the strain hardened high strength nickel based alloy weld metal compositions disclosed are useful in welding high strength steel liners, such as X65 and X80 steel pipe.

The strain hardened high strength nickel based alloy weld metal compositions disclosed herein may be welded using all conventional fusion welding methods, including, but not limited to: SMAW (Shielded Metal Arc Welding), SAW (Submerged Arc Welding), GMAW (GasMetal SRc Welding), FCAW (Flux Cored Arc Welding), PAW (Plasma Arc Welding), ESW (Electroslag Welding), EGW (Electrogas Welding), RW (Resistance Welding), and OFW (Oxyfuel Gas Welding). In addition, the strain hardened high strength nickel based alloy weld metal compositions may be welded by solid state methods, such as friction stir welding (FSW) or a combination of fusion welding methods and solid state welding methods (FSW). The benefits of FSW are primarily derived from the following characteristics: (1) lower temperatures required to perform the joining and lower temperatures in the joint cause less detrimental effects in the adjoining base metal (e.g., coarse grains); (2) high degree of plastic deformation resulting from the rotation of the tool which results in fine grain size which is conducive to improved strength and toughness; and (3) avoidance of hydrogen embrittlement in weldments as compared to fusion welds, which are often prone to hydrogen embrittlement from the decomposition of the residual moisture in the arc. The use of FSW welding in oil, gas and petrochemicals applications is disclosed in U.S. patent application Ser. No 11/643,528, herein incorporated by reference in its entirety.

The advantageous properties provided by using the strain hardened high strength nickel based alloy weld metal compositions disclosed herein, include one or more of the following non-limiting properties, increased fatigue resistance, increased toughness, increased strain capacity, increased tensile strength, increased stress corrosion cracking resistance, higher hydrogen embrittlement resistance and an enhanced overmatched condition relative to the substrate being welded.

Applications

The strain hardened high strength nickel based alloy weld metal compositions disclosed herein find particular application in joining high strength metal substrates (ferrous and non-ferrous) where an overmatched condition of the weldment yield strength relative to the meal substrate is advantageous. Non-limiting exemplary metal substrates include high strength steels (X-65, X-80, etc.), high strength nickel alloys and high strength titanium alloys.

The strain hardened high strength nickel based alloy weld metal compositions disclosed herein may be used in the welding of duplex stainless steels (duplex s.s. or DSS). Duplex s.s. derives its strength and corrosion resistance from a controlled balance of ferrite and austenite phases. The desired mixture of phases in the bulk duplex s.s. is achieved by controlled hot working and/or a combination of cold working and annealing treatments. However, when duplex s.s. is welded, the steel is heated to a very high temperature in a single phase ferrite region and cools to the duplex phase upon cooling to room temperature. In order to achieve the required balance of phases in the weldment at room temperature, the cooling rate of the weld has to be controlled. In practice, the cooling rate varies considerably affecting the phase balance and thus the resultant properties of the weldment. The welding of duplex s.s. using the strain hardened high strength nickel based alloy weld metal compositions disclosed herein may provide improved joint properties. In the case of the strain hardened high strength nickel based alloy weld metal compositions, the welds consist predominantly of a single phase (e.g. cubic or hexagonal), and, therefore, weld property degradation through improper cooling would be minimized. The welds essentially have a single phase and, therefore, would be relatively insensitive to cooling rates.

The strain hardened high strength nickel based alloy weld metal compositions disclosed herein may be used to form welds, for example as spot welds and butt welds, as well as to repair weld areas. More particularly, the nickel based alloy weld compositions disclosed herein may be used to join and repair/treat respectively steel structures and structural components associated with the oil, gas and petrochemical industry. The weld compositions disclosed herein may be utilized either in a manufacturing facility such as a steel mill where the components are made or in the field of fabrication yard where the components are assembled. The fusion welding, friction stir welding, electron beam welding, laser beam welding, and combinations thereof using the strain hardened high strength nickel based alloy weld metal compositions disclosed herein are also suitable for forming and repairing/treating structures in oil and gas exploration, production and refining applications. FSW is particularly advantageous for forming spot welds and butt welds of tubular components in these types of applications.

Exemplary, but non-limiting, structures in the oil and gas exploration, production, refining industry where the novel strain hardened high strength nickel based alloy weld metal compositions disclosed herein are suitable include high strength pipeline weld areas, SCR and TTR weld areas, threaded components, oil drilling equipment weld areas (i.e. two sections of a deep water oil drill string), Liquified Natural Gas (LNG) and Pressurized Liquified Natural Gas (PLNG) or Compressed Natural Gas (CNG) container weld areas, riser/casing joints, and well head equipment.

In oil and gas upstream applications, the novel strain hardened high strength nickel based alloy weld metal compositions disclosed herein are also suitable for joining and repairing structures and components used in natural gas transportation and storage type applications. In particular, the strain hardened nickel based alloy weld metals disclosed herein may be utilized to enable gas transportation technologies ranging from pipelines, compressed natural gas (CNG), pressurized liquefied natural gas (PLNG), liquefied natural gas (LNG) and other storage/transportation technologies. In one form in natural gas transportation and storage type applications, the weld compositions disclosed herein may be used for the joining/processing of pipelines, flow lines, gathering lines, expansion loops, and other transmission lines. In another form in natural gas transportation and storage type applications, the weld compositions disclosed herein may be used for joining/processing of materials made of carbon steels, high strength steels, cast irons, structural steels, or corrosion resistant alloys comprising steels, cast irons, stainless steels, duplex stainless steels, nickel or cobalt based alloys, titanium based alloys, other Fe-Ni alloys (e.g. Invar) or joining of other dissimilar metals (e.g. steel and nickel). In yet another form in natural gas transportation and storage type applications, the weld compositions disclosed herein may be used for the joining/processing of LNG, CNG, and PLNG storage and/or transportation structures. This includes modular LNG structures, shipping vessels, transferring components and pipelines, and related technologies (e.g. 9% Ni tanks, Invar tanks).

In oil and gas exploration and production applications, the strain hardened high strength nickel based alloy weld metal compositions disclosed herein also may be utilized for joining and repairing various structures used for oil and gas well completion and production. These structures include, but are not limited to, offshore and onshore production structures, oil pipelines, oil storage tanks, casing/tubing, completion and production components, cast structure to flow line connections, subsea components, downhole tubular products (e.g. OCTG), topsides and related structures, umbilicals, tender and supply vessels, and flare towers. More particularly, exemplary offshore production structures include jacketed platforms, mobile offshore drilling units and related production components like casings, tendons, risers, and subsea facilities. Mobile offshore drilling units include, but are not limited to, semi-submersibles and jack-up rigs, TLPs, DDCVs, compliant towers, FPSO, FSO, ships, tankers and the like. Exemplary subsea components include, but are not limited to, duplex, manifold systems, trees, and BOPs. Exemplary topsides and related structures include deck superstructures, drilling rigs, living quarters, helidecks, and related structures. It should be understood that FSW may be used to form the welds comprising such structures and components and FSP may be used to repair and treat the welds or joints comprising such structures.

In downstream applications, the strain hardened high strength nickel based alloy weld metal compositions disclosed herein are suitable for joining and repairing structures and components used in refining and chemical plants. The weld compositions disclosed herein provide advantages in the refining and chemicals plant applications through, inter alia, repair of components/structures, dissimilar metal joining, joining of steel structures and joining of difficult to weld materials, such as cast iron. These applications include, but are not limited to, cast iron, heat exchanger tubes and low and high-temperature process and pressure vessels. Exemplary low and high-temperature process and pressure vessels include steam cracker tubes, steam reforming tubes, and refinery structures and components.

The strain hardened high strength nickel based alloy weld metal compositions disclosed herein also find application in a number of industries other than oil, gas and petrochemical. For example, transportation (including automotive), construction and appliance industries are areas where the strain hardened high strength nickel based alloy weld metal compositions disclosed herein may also find benefit in the joining of metal structures.

In the practice of the present disclosure, whether performing fusion welding, FSW, FSP, laser beam welding, or electron beam welding with the novel weld compositions disclosed herein, the process is conducted under conditions sufficient to provide a weld joint or crack repair having a preselected property or set of properties based on the intended use of the weldment. For example, if the use of the weldment requires toughness over fatigue, the conditions are chosen to favor a weld having those properties.

In one form of the welding methods utilizing the strain hardened high strength nickel based alloy weld metal compositions disclosed herein, a data base of weld properties, including but not limited to toughness, strengths, strain or contraction, hardness, fatigue, grain size and the like, for various base metals is obtained and correlated to the welding conditions under which the weld or repair was performed. Then when a property or set of properties is chosen for weld joint for an intended application, the weld compositions and welding or repair conditions employed are selected from those conditions that produce the chosen property or properties.

As will be readily appreciated, the work pieces described in the above embodiments need not be formed of the same base metal. Similarly, the weld metal composition need not be formed of the same metal as the work pieces. Thus the work pieces are formed generally of a ferrous material and the weld metal comprising the weld compositions disclosed herein of a different material (strain hardened high strength nickel based alloy weld metal compositions disclosed herein). However the work pieces may be formed of a non-ferrous material (such as a nickel based alloy) and welded with strain hardened high strength nickel based alloy weld metal compositions disclosed herein.

Applicants have attempted to disclose all forms and applications of the disclosed subject matter that could be reasonably foreseen. However, there may be unforeseeable, insubstantial modifications that remain as equivalents. While the present disclosure has been described in conjunction with specific, exemplary forms thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. A weldment consisting of: two or more segments of ferrous components, and fusion welds bonding adjacent segments of the components together, wherein the welds comprise a strain hardened nickel based alloy weld. metal composition including greater than or equal to 10 wt % Mo based on the total weight of the nickel based alloy weld metal composition, wherein the ferrous components are a high strength steel.

2. The weldment of claim 1 wherein the Mo is greater than or equal to 15 wt %.

3. The weldment of claim 1 further including greater than or equal to 3 wt %.

4. The weldment of claim 1 further including greater than or equal to 5 wt % Cr.

5. The weldment of claim 1 further including one or more alloying elements chosen from V, Ti, Co, Mn, Ta, Zr, Hf, aluminum, tin, silicon, niobium, and combinations thereof.

6. The weldment of claim 1 wherein the nickel based alloy weld metal composition is chosen from Hastelloy B-2(67 wt. % Ni, 1.0 wt. % Co, 1.0 wt. % Cr, 28.0 wt. % Mo, 2.0 wt. % Fe, 0.1 wt. % Si, 1.0 wt. % Mn, 0.02 wt. % C, 0.025 wt. % P, 0.010 wt. % S), Hastelloy C-276(57 wt. % Ni, 2.5 wt % Co, 15.5 wt.% Cr, 16.0 wt. % Mo, 4.0 wt. % W, 5.5 wt. % Fe, 0.08 wt. % Si, 1.0 wt. % Mn, 0.01 wt. % C, 0.025 wt. % P, 0.010 wt. % S, 0.35 wt. % V) and combinations thereof.

7. The weldment of claim 1 wherein the yield strength of the weldment is greater than or equal to 551.6 MPa.

8. The weldment of claim 1 wherein the high strength steel is X-65 steel or X-80 steel.

9. The weldment of claim 1 wherein the method of forming the fusion welds is chosen from SMAW, SAW, GMAW, FCAW, PAW, ESW, EGW, RW, and OFW.

10. The weldment of claim 1 wherein the weldment exhibits one or more of increased fatigue resistance, increased toughness, increased strain capacity, increased tensile strength, increased stress corrosion cracking resistance, higher hydrogen embrittlement resistance, and increased overmatched condition relative to the two or more ferrous or non-ferrous components.

11. The weldment of claim 1 for use in welding structures in the oil, gas and petrochemical industry, the transportation industry, the appliance industry and the construction industry.

12. The weldment of claim 11 wherein the structures in the oil, gas and petrochemical industry include high strength pipelines, steel catenary risers, top tension risers, threaded components, liquefied natural gas containers, pressurized liquefied natural gas containers, deep water oil drill strings, riser/casing joints, well-head equipment, flow lines, gathering lines, transmission lines, shipping vessels, transferring components, storage tanks, and expansion loops.

13. The weldment of claim 11 wherein the structures in the oil, gas and petrochemical industry are used in oil and gas well completion and production structures and components.

14. The weldment of claim 13 wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

15. The weldment of claim 14 wherein the off-shore production structures/components are chosen from jacketed platforms, mobile offshore drilling units, casings, tendons, risers, subsea facilities, semi-submersibles, jack-up rigs, TLPs, DDCVs, compliant towers, :FPSO, FSO, ships, and tankers.

16. The weldment of claim 14 wherein the subsea. components are chosen from duplexes, manifold systems, trees and BOPs.

17. The weldment of claim 11 wherein the structures are used in oil and gas refinery and chemical plant structures and components, and wherein the oil and gas refinery and chemical plant structures and components are chosen from cast iron components, heat exchanger tithes, and low and high temperature process and pressure vessels.

18. The weldment of claim 17 wherein the low and high temperature process and pressure vessels are chosen from steam cracker tubes, and steam reforming tubes.

19. The weldment of claim 1 further including a friction stir weld, an electron beam weld, a laser beam weld, or a combination thereof on top of said fusion weld.

20. A method of joining two or more metal structures consisting of:
  providing two or more segments of ferrous components, and
  fusion welding adjacent segments of the components together,
  wherein the welds comprise a strain hardened nickel based alloy weld metal composition including greater than or equal to 10 wt % Mo based on the total weight of the strain hardened nickel based alloy weld metal composition, wherein the ferrous components are a high strength steel.

21. The method of claim 20 wherein cooling of the welds occurs under ambient conditions.

22. The method of claim 20 wherein cooling of the welds occurs using an artificial means for increasing the cooling rate of the welds.

23. The method of claim 20 wherein the Mo is greater than or equal to 15 wt %.

24. The method of claim 20 wherein the welds further include greater than or equal to 3 wt %.

25. The method of claim 20 wherein the welds further include greater than or equal to 5 wt % Cr.

26. The method of claim 20 wherein the welds further include one or more alloying elements chosen from V, Ti, Co, Mn, Ta, Zr, Hf, aluminum, tin, silicon, niobium, and combinations thereof.

27. The method of claim 20 wherein the nickel based alloy weld metal composition is chosen from Hastelloy B-2(67 wt. % Ni, 1.0 wt. % Co, 1.0 wt. % Cr, 28.0 wt. % Mo, 2.0 wt. % Fe, 0.1 wt. % Si, 1.0 wt. % Mn, 0.02 wt. % C, 0.025 wt. % P, 0.010 wt. % S), Hastelloy C-276(57 wt. % Ni, 2.5 wt % Co, 15.5 wt. % Cr, 16.0 wt. % Mo, 4.0 wt. % W, 5.5 wt. % Fe, 0.08 wt. % Si, 11.0 wt. % Mn, 0.01 wt. % C, 0.025 wt. % P, 0.010 wt. % S, 0.35 wt. % V) and combinations thereof.

28. The method of claim 20 wherein the yield strength of the welds is greater than or equal to 551.6 MPa.

29. The method of claim 20 wherein the high strength steel is X-65 steel or X-80 steel.

30. The method of claim 20 wherein the fusion welding step is chosen from SMAW, SAW, GMAW, FCAW, PAW, ESW, EGW, RW, and OFW.

31. The method of claim 20 wherein the welds exhibit one or more of increased fatigue resistance, increased toughness, increased strain capacity, increased tensile strength, increased stress corrosion cracking resistance, higher hydrogen embrittlement resistance, and increased overmatched condition relative to the two or more ferrous or non-ferrous components.

32. The method of claim 20 for use in welding structures in the oil, gas and petrochemical industry, the transportation industry, the appliance industry and the construction industry.

33. The method of claim 32 wherein the structures for use in the oil, gas and petrochemical industry include high strength pipelines, steel catenary risers, top tension risers, threaded components, liquefied natural gas containers, pressurized liquefied natural gas containers, deep water oil drill strings, riser/easing joints, well-head equipment, flow lines, gathering lines, transmission lines, shipping vessels, transferring components, storage tanks, and expansion loops.

34. The method of claim 32 wherein the structures for use in the oil, gas and petrochemical industry are used in oil and gas well completion and production structures and components.

35. The method of claim 34 wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

36. The method of claim 35 wherein the off-shore production structures/components are chosen from jacketed platforms, mobile offshore drilling units, casings, tendons, risers, subsea facilities, semi-stibmersibles, jack-up rigs, 'III's, DDCVs, compliant towers, FPSO, FSO, ships, and tankers.

37. The method of claim 35 wherein the subsea components are chosen from duplexes, manifold systems, trees and BOPs.

38. The method of claim 32 wherein the structures are used in oil and gas refinery and chemical plant structures and components, and wherein the oil and gas refinery and chemical plant structures and components are chosen from cast iron components, heat exchanger tubes, and low and high temperature process and pressure vessels.

39. The method of claim 38 wherein the low and high temperature process and pressure vessels are chosen from steam cracker tubes, and steam reforming tubes.

40. A method for welding two or more ferrous components to produce a weld having a specific property or set of properties chosen for an intended application, the method consisting of:
  obtaining a data base of weld properties for nickel based welds formed by fusion welding under a plurality of conditions and from various weld metal compositions;
  correlating the weld conditions and weld metal compositions to the weld properties;
  selecting the weld conditions from the data base that will produce a weld having the property or set of properties best suited to the intended application;
  subjecting the components to fusion welding under the conditions selected to form a welded structure,
  wherein the weld comprises a strain hardened nickel based alloy weld metal composition including greater than or equal to 10 wt % Mo based on the total weight of the strain hardened nickel based alloy weld metal composition, wherein the ferrous components are a high strength steel.

41. The method of claim 40 wherein the weld further includes greater than or equal to 3 wt % W.

42. The method of claim 40 wherein the nickel based alloy weld metal composition is chosen from Hastelloy B-2 (67 wt. % Ni, 1.0 wt % Co, 1.0 wt. % Cr, 28.0 wt. % Mo, 2.0 wt. % Fe, 0.1 wt. % Si, 1.0 wt. % Mn, 0.02 wt. % C, 0.025 wt. % P, 0.010 wt. % S), Hastelloy C-276(57 wt. % Ni, 2.5 wt % Co, 15.5 wt. % Cr, 16.0 wt. % Mo, 4.0 wt. % W, 5.5 wt. % Fe, 0.08 wt. % Si, 1.0 wt. % Mn, 0.01 wt. % C, 0.025 wt. % P, 0.010 wt. % S, 0.35 wt. % V), and combinations thereof.

43. The method of claim 20 further including friction stir welding, electron beam welding, laser beam welding, or a combination thereof after said fusion welding step.

* * * * *